(12) United States Patent
Yamada et al.

(10) Patent No.: US 12,355,172 B2
(45) Date of Patent: *Jul. 8, 2025

(54) CONTACT MEMBER, CONNECTOR, COMPOSITION, AND METHOD FOR PRODUCING CONTACT MEMBER

(71) Applicant: Japan Aviation Electronics Industry, Limited, Tokyo (JP)

(72) Inventors: Kazuhiko Yamada, Tokyo (JP); Akiko Suzuki, Tokyo (JP); Akinobu Sato, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 405 days.

This patent is subject to a terminal disclaimer.

(21) Appl. No.: 17/895,614

(22) Filed: Aug. 25, 2022

(65) Prior Publication Data
US 2023/0006386 A1    Jan. 5, 2023

Related U.S. Application Data

(63) Continuation of application No. PCT/JP2021/006313, filed on Feb. 19, 2021.

(30) Foreign Application Priority Data

Mar. 27, 2020  (JP) ................ 2020-057814
Jan. 25, 2021  (JP) ................ 2021-009589

(51) Int. Cl.
*H01R 13/03*    (2006.01)
*B22F 1/068*    (2022.01)
(Continued)

(52) U.S. Cl.
CPC ............ *H01R 13/03* (2013.01); *B22F 1/068* (2022.01); *B22F 1/102* (2022.01); *C10M 169/04* (2013.01);
(Continued)

(58) Field of Classification Search
CPC .......... H01B 1/22; H01H 1/023; H01H 1/025; H01R 13/03; C10M 169/04; B22F 1/102
See application file for complete search history.

(56) References Cited

U.S. PATENT DOCUMENTS 6,372,337 B2 *  4/2002  Takahashi ............ C10M 107/50
                                                            524/786
2004/0142604 A1  7/2004  Ladin et al.
(Continued)

FOREIGN PATENT DOCUMENTS

EP    3419118    * 12/2018
EP    3419118 A1 * 12/2018
(Continued)

OTHER PUBLICATIONS

Chemours "KrytoxTM Performance Lubricants Product Overview," Jan. 1, 2015, 20 pages Retrieved from the Internet: URL:https://www.krytox.com/fr/-/media/file (XP 093067632).

*Primary Examiner* — Mark Kopec
(74) *Attorney, Agent, or Firm* — MUNCY, GEISSLER, OLDS & LOWE, P.C.

(57) ABSTRACT

The present invention provides a contact member that strikes a balance between low electrical resistance and sliding durability. A contact member of the invention has a metal base and a coating disposed on at least part of the metal base. The coating contains fluorinated oil having a polar group, and metal particles surface-treated with a fluorine-based compound having a polar group.

10 Claims, 9 Drawing Sheets

(51) Int. Cl.
  *B22F 1/102*   (2022.01)
  *C10M 169/04*  (2006.01)
  *C23C 22/02*   (2006.01)
  *C23C 24/10*   (2006.01)
  *C23C 26/00*   (2006.01)
  *H01B 1/22*    (2006.01)
  *H01H 1/025*   (2006.01)
  *B60L 53/16*       (2019.01)
  *C10L 1/20*        (2006.01)
  *C10M 147/00*      (2006.01)
  *C10N 10/02*       (2006.01)
  *C10N 20/00*       (2006.01)
  *C10N 20/06*       (2006.01)
  *C10N 30/00*       (2006.01)
  *C10N 30/06*       (2006.01)
  *C10N 40/14*       (2006.01)
  *C10N 50/00*       (2006.01)
  *C10N 50/02*       (2006.01)
  *C10N 70/00*       (2006.01)
  *C10N 80/00*       (2006.01)
  *C22C 1/04*        (2023.01)
  *C23C 22/00*       (2006.01)
  *H01R 12/55*       (2011.01)
  *H01R 12/73*       (2011.01)
  *H01R 13/04*       (2006.01)
  *H01R 13/11*       (2006.01)
  *H01R 43/16*       (2006.01)

(52) U.S. Cl.
  CPC .............. *C23C 22/02* (2013.01); *C23C 24/10* (2013.01); *C23C 26/00* (2013.01); *H01B 1/22* (2013.01); *H01H 1/025* (2013.01); *B60L 53/16* (2019.02); *C10L 1/20* (2013.01); *C10L 1/206* (2013.01); *C10M 147/00* (2013.01); *C10M 2201/04* (2013.01); *C10M 2201/05* (2013.01); *C10M 2211/0406* (2013.01); *C10M 2211/06* (2013.01); *C10M 2211/063* (2013.01); *C10M 2213/06* (2013.01); *C10M 2213/0606* (2013.01); *C10N 2010/02* (2013.01); *C10N 2020/06* (2013.01); *C10N 2020/061* (2020.05); *C10N 2030/06* (2013.01); *C10N 2030/28* (2020.05); *C10N 2040/17* (2020.05); *C10N 2050/015* (2020.05); *C10N 2050/02* (2013.01); *C10N 2070/00* (2013.01); *C10N 2080/00* (2013.01); *C22C 1/0466* (2013.01); *C23C 22/00* (2013.01); *H01R 12/55* (2013.01); *H01R 12/73* (2013.01); *H01R 13/04* (2013.01); *H01R 13/111* (2013.01); *H01R 13/113* (2013.01); *H01R 43/16* (2013.01)

(56) References Cited

U.S. PATENT DOCUMENTS

2006/0134403 A1    6/2006  Ohwaki et al.
2015/0357737 A1   12/2015  Sunaga et al.

FOREIGN PATENT DOCUMENTS

| | | |
|---|---|---|
| JP | 10223290 A | 8/1998 |
| JP | 200519103 A | 1/2005 |
| JP | 2006206702 A | 8/2006 |
| JP | 4348288 B2 | 10/2009 |
| JP | 2012018869 A | 1/2012 |
| JP | 201299398 A | 5/2012 |
| JP | 2014135191 A | 7/2014 |
| JP | 201890657 A | 6/2018 |

\* cited by examiner

CONTACT MEMBER, CONNECTOR, COMPOSITION, AND METHOD FOR PRODUCING CONTACT MEMBER

CROSS REFERENCE TO RELATED APPLICATIONS

This application is a Continuation of co-pending International Application No. PCT/JP2021/006313, filed on Feb. 19, 2021, for which priority is claimed under 35 U.S.C. § 120; and this application claims priority of Application No. 2020-057814 filed in Japan on Mar. 27, 2020 and Application No. 2021-009589 filed in Japan on Jan. 25, 2021 under 35 U.S.C. § 119, the entire contents of all of which are hereby incorporated by reference.

BACKGROUND OF THE INVENTION

The present invention relates to a contact member, a connector, a composition, and a method for producing the contact member.

Efforts have been made to reduce resistance in electrical connection parts (connectors) that need to pass high current such as charging plugs for electrical vehicles, in order to minimize heat generation or power loss. This is why silver, gold, and copper, which have a low electrical resistivity, are used primarily as the material of contacts. Sometimes, gold- or silver-plated copper or copper alloys are used.

Situations arise where two surfaces of electrical contacts repeatedly slide in contact with each other under a constant pressure, such as when two surfaces slide on each other due to repeated insertion and extraction, or when the contacts are subjected to vibration in the environment of use after being fitted together. Such sliding leads to adhesive wear at the contacts, and results in problems such as raised electrical resistance due to worn surfaces undergoing transformation such as oxidation, or an increase in an insertion and extraction force due to adhesion.

Coating contact portions with organic component-containing compositions for providing lubrication effects is widely practiced to minimize such wear caused by sliding at contacts. JP 2014-135191 A discloses a technique for reducing friction resistance wherein a layer of silver plating is formed in electrical contact portions of a connecter terminal, on which a coating layer is further formed, the coating layer consisting of a film formed by contact with a solution containing thiol and benzotriazole. JP 4348288 B2 discloses a technique for forming a coating of a mixture of fluororesin fine particles and fluorinated oil on electrical contact portions.

SUMMARY OF THE INVENTION

Meanwhile, contact members for high current applications, specifically, contact members that are low in resistance both at the start of sliding and during sliding, are in demand in recent years. Being low in resistance both at the start of sliding and during sliding as noted above is herein referred to also as showing low electrical resistance.

The present inventors looked into the techniques described in JP 2014-135191 A and JP 4348288 B2 and found that no investigation was conducted on the electrical resistance at the start of sliding as well as during sliding, and it was not clear if these techniques were able to achieve low resistance both at the start of sliding and during sliding.

Namely, a contact member that strikes a balance between low electrical resistance and sliding durability is not found in prior art and is desired to be developed.

The phrase "showing sliding durability", as used herein, is intended to mean having a low friction coefficient during sliding, as well as withstanding a large number of sliding cycles until a metal base in the contact member becomes exposed during sliding.

In view of the above circumstances, an object of the present invention is to provide a contact member that strikes a balance between low electrical resistance and sliding durability.

Intensive research conducted by the present inventors led to the finding that the above problem is able to be solved by the following configurations.

(1) A contact member comprising: a metal base; and a coating disposed on at least part of the metal base, the coating containing fluorinated oil having a polar group, and metal particles surface-treated with a fluorine-based compound having a polar group.

(2) The contact member according to (1), wherein a metal of the metal base is identical to that of the metal particles.

(3) The contact member according to (1) or (2), wherein the polar group is a hydroxyl group.

(4) The contact member according to any of (1) to (3), wherein a ratio of a content (mass %) of the fluorinated oil to a content (mass %) of the metal particles (fluorinated oil content (mass %)/metal particle content (mass %)) is 15 to 25.

(5) The contact member according to any of (1) to (4), wherein the metal particles have an average secondary particle size of 1.7 μm to 2.1 μm.

(6) The contact member according to any of (1) to (5), wherein a ratio of an area of the metal particles to an area of the coating, when the coating is observed from a normal direction of the coating, is 3.6% to 15.0%.

(7) The contact member according to any of (1) to (6), wherein the metal base has a Vickers Hardness of 180 Hv or less.

(8) The contact member according to any of (1) to (7), wherein the metal base has surface roughness with a maximum height Ry of 0.5 μm to 1.7 μm.

(9) The contact member according to (7) or (8), wherein a ratio of an average secondary particle size (μm) of the metal particles to a maximum height Ry (μm) of surface roughness of the metal base (average secondary particle size (μm) of the metal particles/maximum height Ry (μm) of surface roughness of the metal base) is 1.0 to 1.2.

(10) A connector comprising the contact member according to any of (1) to (9).

(11) A composition used for formation of a coating of a contact member including a metal base and the coating disposed on at least part of the metal base, the composition comprising: fluorinated oil having a polar group; and metal particles surface-treated with a fluorine-based compound having a polar group.

(12) A method for producing the contact member according to any of (1) to (9), comprising the step of forming the coating by supplying the composition according to (11) on the metal base.

The present invention can provide a contact member that strikes a balance between low electrical resistance and sliding durability.

DETAILED DESCRIPTION OF THE INVENTION

Figure 1:
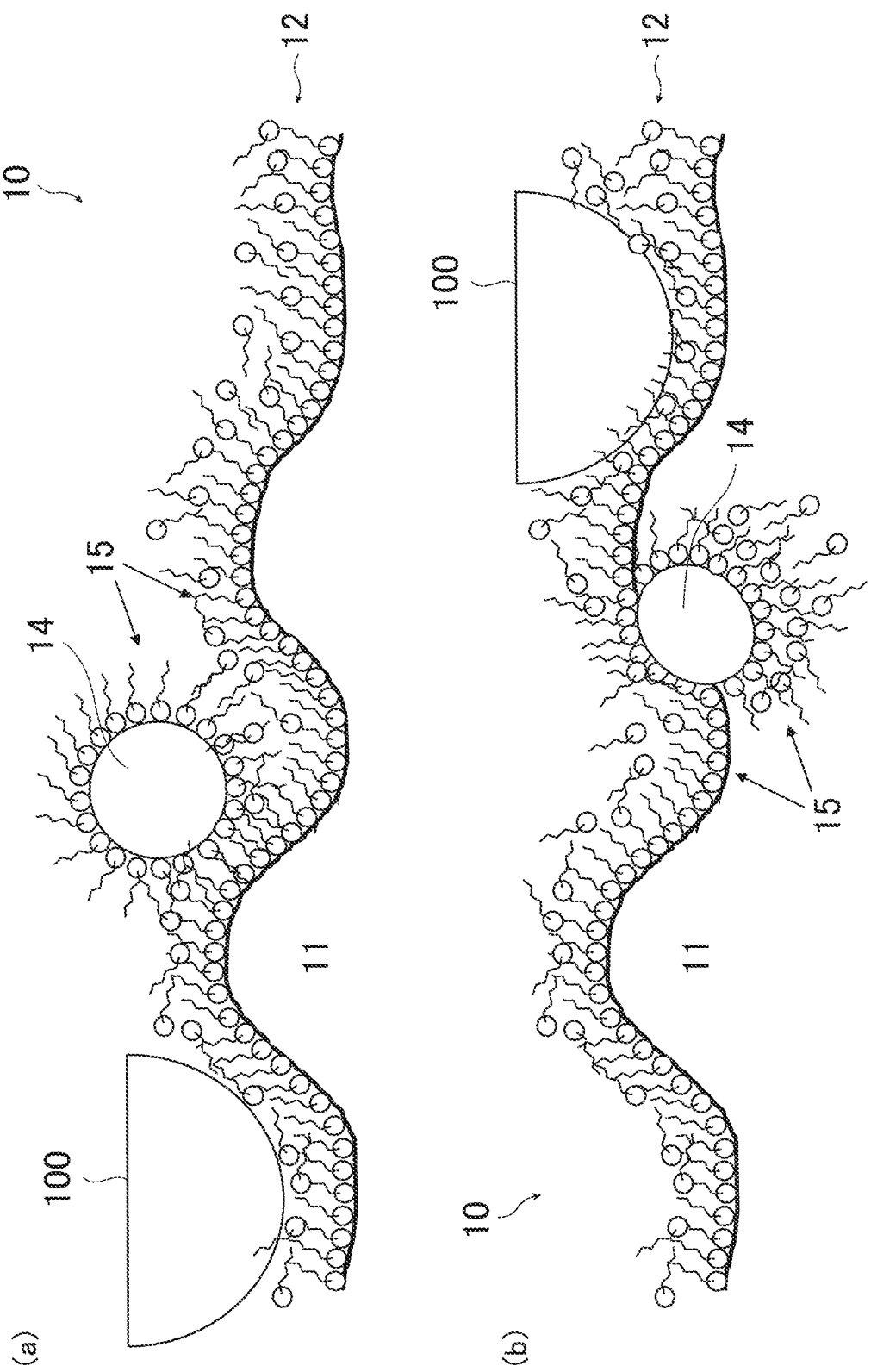
FIG. 1 is a schematic diagram for describing a presumed mechanism of a contact member according to the present invention.

Embodiments of this invention are described below based on the appended drawings.

Any numerical range expressed using "to", as used herein, is intended to include the values recited before and after "to" as the lower limit and upper limit.

A contact member according to the present invention includes a metal base and a coating disposed on at least part of the metal base. The coating contains fluorinated oil having a polar group, and metal particles surface-treated with a fluorine-based compound having a polar group.

Various parts included in the contact member of the present invention are described in detail below.

<Metal Base>

The metal base constitutes an electrical contact in the contact member of the present invention.

Materials constituting the metal base are not limited in particular and desired to be low in electrical resistance. Preferable constituent materials for the metal base are silver, gold, or copper.

The metal base may have a single-layer structure, or a multilayer structure.

In the case where the metal base has a multilayer structure, the metal base may have a base material (metal support) and a plating layer disposed on a surface of the base material. While examples of metals for the plating layer particularly low in electrical resistance are gold, silver, and copper, materials constituting the plating layer are not limited in particular and may be other metals such as, for example, tin, nickel, platinum, rhodium, and various alloys made by adding other metals to these metals to adjust hardness or corrosion resistance, i.e., any metal having electrical conductivity and useable as plating metal.

The surface of the metal base may be treated in various ways. For example, the metal base may be surface-treated to prevent discoloration. One example of surface treatment for preventing discoloration is a treatment of forming a film of alkanethiol on the surface of the metal base (if the metal base has a plating layer, on the surface of the plating layer).

The metal base preferably has a Vickers hardness of 180 Hv or less, and more preferably 120 Hv or less.

The lower limit of the Vickers hardness of the metal base is preferably, but not particularly limited to, 3 Hv or more.

The metal base has surface roughness, in most cases with a maximum height Ry (maximum height Ry of surface roughness of the surface on a coated side of the metal base) of 0.1 μm to 5.0 μm, but not particularly limited thereto. The maximum height Ry is preferably 0.5 μm to 1.7 μm for better sliding durability of the contact member.

The maximum height Ry of the surface roughness of the metal base can be controlled by a known method. For a metal base that does not have a plating layer, for example, the maximum height of surface roughness can be controlled by machining conditions of a cutting operation such as cutting depth and feed pitch, or by surface treatment such as blasting or chemical etching after the cutting operation. For a metal base that has a plating layer, the maximum height of surface roughness can also be controlled by plating conditions such as deposition speed and temperature.

<Coating>

The coating is a layer disposed on at least part of the metal base described above.

The coating may be disposed on an entire surface of the metal base, or on some part of the metal base. In cases where the coating is disposed on some part of the metal base, the coating may be located on one or both of opposing two main surfaces of the metal base.

(Fluorinated Oil Having a Polar Group)

The coating contains fluorinated oil having a polar group (hereinafter also referred to simply as "specified oil").

Fluorinated oil is a compound that contains a fluorine atom in the molecule and takes on an oil form. Oil form here is intended to mean a liquid form at room temperature (23° C.).

Fluorinated oil often has a shear viscosity of 0.7 to 2.5 Pa·s in a shear rate range of 0.01 to 1000 $s^{-1}$, and preferably has a shear viscosity of 0.1 to 5.0 Pa·s in a shear rate range of 0.01 to 1000 $s^{-1}$.

The molecular weight of the specified oil is not limited in particular. For striking a balance between low electrical resistance and sliding durability, the specified oil preferably has a molecular weight of 300 to 2000, and more preferably 300 to 1000.

Here, the term "molecular weight" is intended to mean chemical formula weight. Note that, however, mass-average molecular weight is used as the molecular weight for polymer or oligomer compounds whose chemical formula weight cannot be specified uniquely for reasons such as the chemical formula weight being different depending on individual molecules. The method for measuring the mass-average molecular weight is not limited in particular. Preferably, the mass-average molecular weight may be measured using gel permeation chromatography (GPC). The standard polymer and solvent (mobile phase) used for the measurement of mass-average molecular weight by GPC may be selected as suited to a target fluorinated oil whose mass-average molecular weight is to be measured.

Examples of a polar group in the specified oil include, but not particularly limited to, a hydroxyl group, a thiol group, an amino group, an epoxy group, a methacryloxy group, an acryloxy group, a carboxy group, an ether bond, and an ester bond. For striking a balance between electrical resistance and sliding durability, a hydroxyl group or a thiol group is preferable, with a hydroxyl group being more preferable.

The specified oil may have any number of polar groups, which is for example one, but not particularly limited thereto, and may be two or more. In particular, the number of polar groups is preferably 1 to 4, and more preferably 1, for striking a balance between low electrical resistance and sliding durability.

The position of the polar group in the specified oil is not limited in particular. For striking a balance between low electrical resistance and sliding durability, the specified oil has a polar group preferably at the end of a chain.

The specified oil may have a straight chain, or a branched chain. The fluorinated oil may also include a cyclic structure.

The specified oil includes a skeleton containing a fluorine atom such as a fluorocarbon skeleton, a perfluoropolyether skeleton, a fluorine-modified silicone skeleton, and a fluoroester skeleton, in addition to a polar group.

A perfluoroether skeleton is a skeleton configured with a repeating unit represented by Formula (A).

—(OL$^1$)-            Formula (A)

L$^1$ represents a perfluoroalkylene group. The perfluoroalkylene group preferably contains 1 to 10, more preferably 2 to 6, and even more preferably 2 to 3 carbon atoms.

Examples of preferable specified oils include a compound represented by Formula (1), and a compound represented by Formula (2).

(R$^f$—(OL$^1$))$_n$-L$^2$-(R$^1$)$_m$         Formula (1)

(R$^2$-L$^2$-(R$^1$))$_m$         Formula (2)

L$^1$ in Formula (1) is as defined above.

The letter n represents an integer of 2 or more. In particular, n is preferably 3 to 20, and more preferably 3 to 6, for striking a balance between low electrical resistance and sliding durability.

L$^2$ in Formula (1) represents an (m+1)-valent aliphatic hydrocarbon group. For example, when m=1, L$^2$ represents a divalent aliphatic hydrocarbon group, and when m=2, L$^2$ represents a trivalent aliphatic hydrocarbon group. The number of carbon atoms in the aliphatic hydrocarbon group is not limited in particular. Preferably, the aliphatic hydrocarbon group contains 1 to 10, more preferably 1 to 6, and even more preferably 1 to 3 carbon atoms.

R$^f$ in Formula (1) represents a perfluoroalkyl group. The perfluoroalkyl group preferably contains 1 to 5, and more preferably 2 to 4 carbon atoms.

R$^1$ in Formula (1) represents a polar group. Preferable examples of polar groups are as listed above.

The letter m in Formula (1) represents an integer of 1 or more. In particular, m is preferably 1 to 4, and more preferably 1 to 2, for striking a balance between low electrical resistance and sliding durability.

R$^2$ in Formula (2) represents a perfluoroalkyl group. The number of carbon atoms in the perfluoroalkyl group is not limited in particular. Preferably, the perfluoroalkyl group contains 4 to 20, more preferably 5 to 15, and even more preferably 6 to 12 carbon atoms.

The definitions of L$^2$, R$^1$, and m in Formula (2) are the same as the definitions of respective groups in Formula (1).

Examples of specified oils include, for example, 1H,1H-heptadecafluoro-1-nonanol, 1H,1H,10H,10H-hexadecafluoro-1,10-decanediol, 1H,1H-perfluoro-3,6,9-trioxadecan-1-ol, 1H,1H,11H,11H-dodecafluoro-3,6,9-trioxaundecane-1,11-diol, 1H,1H,2H,2H-perfluorodecan-1-ol, 3,5-bis(trifluoromethyl)benzene-1-ol, 1H,1H-perfluoro(2,5,8,11,14-pentamethyl-3,6,9,12,15-oxaoctadecan-1-ol), 1H,1H,2H,2H-perfluorodecanethiol, and 3,5-bis(trifluoromethyl)benzenethiol.

Commercially available products may also be used as the specified oil. Commercially available products include, for example, MORESCO PHOSFAROL A-20H (manufactured by MORESCO Corporation), DEMNUM (registered trademark) S-65 (manufactured by DAIKIN Industries, Ltd.), and FOMBLIN (registered trademark) ZDOL (manufactured by Solvay).

The specified oil content in the coating is preferably, but not particularly limited to, 50.00 mass % to 99.99 mass %, and more preferably 60.00 to 97.00 mass % relative to the total mass of the coating, for striking a balance between low electrical resistance and sliding durability.

One type of specified oil may be used alone, or two or more types may be used in combination.

(Metal Particles Surface-Treated with a Fluorine-Based Compound Having a Polar Group)

The coating contains metal particles surface-treated with a fluorine-based compound having a polar group (hereinafter also referred to simply as "specified metal particles").

The specified metal particles in the coating serve as an electrical contact.

The metals in the specified metal particles are not limited to a particular metal and may be any of known metals such as, typically, silver, gold, copper, tin, and nickel. In particular, for striking a balance between low electrical resistance and sliding durability, the metal of the metal base described above is preferably the same as the metal of the specified metal particles.

In the case where the metal base has a plating layer, the metal forming the plating layer is preferably the same as the metal of the specified metal particles.

The specified metal particles contain a fluorine-based compound having a polar group (hereinafter also referred to simply as "specified compound"). The specified compound functions as a surface modifier of the metal particles.

The specified compound contains a polar group that may be, but not limited particularly to, one of the examples of polar groups of the specified oil listed above.

The specified compound is not limited to a particular compound as long as it contains a polar group and a fluorine atom. In particular, the specified oils listed above are preferable for striking a balance between low electrical resistance and sliding durability.

The specified metal particles have an average primary particle size that is not limited in particular but preferably 0.2 μm to 10.0 μm, and more preferably 0.5 μm to 2.0 μm, for striking a balance between low electrical resistance and sliding durability.

The average primary particle size of the specified metal particles is an arithmetic average value obtained by measuring the diameters (particle sizes) of 20 or more specified metal particles using an electron microscope. For any of the observed specified metal particles that are not an exact circle, the size of a longer side is measured as the diameter.

The specified metal particles in the coating have an average secondary particle size that is mostly, but not particularly limited to, 0.2 μm to 10.0 μm, and preferably 1.7 μm to 2.1 μm for striking a balance between low electrical resistance and sliding durability.

The average secondary particle size of the specified metal particles in the coating is an arithmetic average value obtained by measuring the diameters (secondary particle sizes) of 20 aggregates of specified metal particles observed when the coating is observed using a polarizing microscope from a normal direction of the coating. For any of the observed aggregates of specified metal particles that are not an exact circle, the size of a longer side is measured as the diameter.

While the above method obtains an average secondary particle size from 20 aggregates of specified metal particles, the specified metal particles in the same coating are not expected to produce a significant difference in the average secondary particle size.

The specified metal particle content in the coating is preferably, but not particularly limited to, 0.01 to 50.00 mass %, and more preferably 3.00 to 40.00 mass % relative to the total mass of the coating, for striking a balance between low electrical resistance and sliding durability.

One type of specified metal particles may be used alone, or two or more types may be used in combination.

The ratio of the specified oil content (mass %) to the specified metal particle content (mass %) (specified oil content (mass %)/specified metal particle content (mass %)) is, in most cases, but not particularly limited to, 1 to 1000, preferably 10 to 30, and more preferably 15 to 25, for striking a balance between low electrical resistance and sliding durability.

The ratio of the average secondary particle size (μm) of the specified metal particles to the maximum height Ry (μm) of the surface roughness of the metal base mentioned above (average secondary particle size (μm) of specified metal particles/maximum height Ry (μm) of surface roughness of metal base) is, in most cases, but not particularly limited to, 0.1 to 2.0, and preferably 1.0 to 1.2 for striking a balance between low electrical resistance and sliding durability.

The ratio of the area of the specified metal particles to the area of the coating as observed from a normal direction of the coating is in most cases, but not particularly limited to, 0.1% to 50.0%, preferably 0.6% to 30.2%, and more preferably 3.6% to 15.0%, for striking a balance between low electrical resistance and sliding durability.

The ratio of the area of the specified metal particles to the area of the coating is intended to mean a ratio of an area taken up by specified metal particles to an area of coating in an observed region when the coating is observed using a polarizing microscope from a normal direction of the coating. The polarizing microscope has an observation area of 0.11 cm×0.07 cm, and the ratio of the area of the specified metal particles to the area of the coating is an average value of the ratios obtained by the observation at five or more random points of the coating. Some parts of the area taken up by the specified metal particles may include aggregates of the specified metal particles.

While the above method obtains a ratio of an area of specified metal particles to an area of coating by observation at five or more random points of the coating, the same coating is not expected to produce a significant difference in the ratio of the area of specified metal particles to the area of coating.

The method for producing the specified metal particles is not limited to a particular one and may be any of known methods.

For example, specified metal particles may be produced by mixing a specified compound and metal particles in the presence of a solvent.

In the case where a specified compound and metal particles are mixed such that the specified compound remains in excess in the solution produced as above, the solution thus obtained can be used as a composition for use in producing the contact member to be described later.

<Method for Producing Contact Member>

The method for producing the contact member is not limited to a particular one and may be any of known methods.

Supplying a composition that contains a specified oil and specified metal particles onto a metal base is one example of a highly productive method of forming a coating.

The composition is designed for forming the coating and contains the specified oil and specified metal particles described above.

The specified oil content in the composition is preferably, but not particularly limited to, 1.000 to 3.000 mass %, and more preferably 1.500 to 2.500 mass % relative to the total mass of the composition, for striking a balance between low electrical resistance and sliding durability.

The content of specified metal particles in the composition is preferably, but not particularly limited to, 0.001 to 1.000 mass %, and more preferably 0.100 to 0.500 mass % relative to the total mass of the composition, for striking a balance between low electrical resistance and sliding durability.

The ratio of the specified oil content (mass %) to the specified metal particle content (mass %) in the composition (specified oil content (mass %)/specified metal particle content (mass %)) is not limited in particular and is preferably in the range of the ratio in the coating specified above.

The composition may contain a solvent.

Examples of the solvent include, but not particularly limited to, an alcohol-based solvent, an ester-based solvent, a ketone-based solvent, an aliphatic hydrocarbon-based solvent, an alicyclic or aromatic hydrocarbon-based solvent, a halogenated hydrocarbon-based solvent, and a fluorine-based solvent.

The solvent content in the composition is preferably, but not particularly limited to, 50.000 to 99.990 mass %, and more preferably 80.000 to 99.000 mass % relative to the total mass of the composition, for striking a balance between low electrical resistance and sliding durability.

One type of solvent may be used alone, or two or more types may be used in combination.

The composition may be supplied onto the metal base by any method such as, but not particularly limited to, applying the composition on the metal base, or immersing the metal base in the composition.

After supplying the composition on the metal base, a drying process may be carried out as required for evaporation of the solvent. Alternatively, the metal base may be naturally dried to let the solvent evaporate.

<Presumed Mechanism>

While the mechanism in the contact member of the present invention whereby the desired effect is achieved is not clear, a presumed mechanism is described using FIG. 1.

FIG. 1(a) and FIG. 1(b) are schematic diagrams for describing a presumed mechanism of the contact member of the present invention. FIG. 1(a) and FIG. 1(b) show a case where a metal base 11 has a predetermined roughness. In the illustrated case, a specified oil, i.e., fluorinated oil having a polar group, is used for the surface treatment of metal particles 14.

A coating 12 is formed on a surface of the metal base 11 of a contact member 10 of the present invention. More specifically, the molecules of the fluorinated oil 15 having a polar group bond together and form a monomolecular layer on the surface of the metal base 11. On the top of this monomolecular layer, there is formed a fluidized layer of the fluorinated oil 15 that is loosely retained by entanglement of molecular chains. The metal particles 14, with the fluorinated oil 15 bonded to their surfaces by a surface treatment, are dispersed in this fluidized layer. Namely, the coating 12 includes the monomolecular layer and the fluidized layer.

Adhesion occurs when the metal particles 14 dispersed in the fluidized layer of the fluorinated oil 15 are pressed against a surface of the metal base 11 by a terminal 100 and deformed, which establishes electrical connection. Low electrical resistance is thus achieved.

The unit of the adhesion is as low as or lower than that of the metal particle 14 because of the presence of the fluorinated oil 15 around each metal particle 14. Since the adhesion points are very small and distributed, the adhered metals readily separate by application of a small stress. Therefore, while adhesion occurs, it does not develop to cause wear. Sliding durability is thus achieved.

When the metal particles 14 come to a condition where they are embedded in the metal base 11 as shown in FIG. 1(b), this allows the fluorinated oil 15 to be retained inside the metal base 11, letting the oil appear on the surface of the metal base 11 again and function as the fluidized layer when the terminal 100 slides. In this way, the metal particles 14 carrying the fluorinated oil 15 bonded to their surfaces function as a new supply mechanism that prevents shortage of lubricant in a place where sliding is carried out and that allows repeated use of the lubricant.

In order to retain the metal particles 14 and the fluorinated oil 15 in the metal base 11, and more specifically, in order for the metal particles 14 carrying the fluorinated oil 15 bonded to their surfaces to function as a new supply mechanism of repeatedly useable lubricant, it is important to create a condition that allows the metal particles 14 to be embedded in the metal base 11. In order to create a condition where the metal particles 14 are embedded in the metal base 11, it is preferable that the metal base 11 undergo deformation in response to stress. To achieve this, the hardness of the metal base 11 may be controlled as an index of deformation of the metal base 11 relative to stress. Specifically, the Vickers hardness of the metal base 11 is preferably controlled to not exceed 180 Hv.

Solid solution strengthening, precipitation strengthening, work hardening, and crystal grain refinement are commonly used metal hardening means. Various metal materials have found practical application as contact materials, such as, for example, Cu—Ni—Si alloys (known as Corson alloys), a type of precipitation-strengthened copper alloy, and "hardened silver plating" hardened by solid solution strengthening wherein a small amount of metal (such as selenium, antimony, or bismuth) is added during silver plating. In some cases, pure silver is plated and work-hardened afterwards by barrel polishing, since addition of a different kind of metal increases electrical resistance and is not preferable.

In any case, these conventional techniques are employed to make materials for contacts harder to improve sliding durability.

Meanwhile, according to the present invention, the Vickers hardness of the metal base 11 is preferably controlled to not exceed 180 Hv in order to create a condition where metal particles 14 are embedded in the metal base 11.

Applications

The contact member of the present invention is applicable to various uses.

The contact member of the present invention may for example be applied to an electronic component or an electrical device used for turning on and off the current to a switch or a relay. Namely, the present invention also relates to a connector having the contact member.

In usage, the contact members of the present invention may be used such as to slide on each other with their coatings facing each other.

The contact member of the present invention is favorably applied to high-current connectors.

Figure 2:
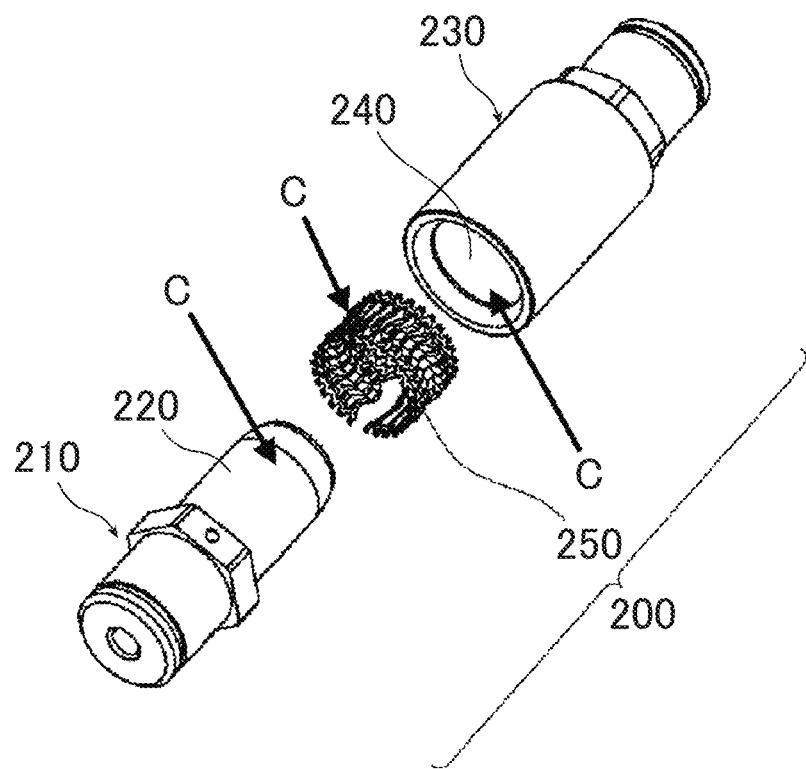
FIG. 2 is a perspective view of a high-current connector.

FIG. 2 is a perspective view of one example of a high-current connector. The particulars of the high-current connector 200 of FIG. 2 are described in JP 2013-8511 A. When applying the contact member of the present invention to the high-current connector 200 of FIG. 2, the coating may be formed on a surface of a plug part 220 of a plug connector 210, a surface of a socket part 240 of a receptacle connector 230, and an entire surface of a contact unit 250, which form a sliding part of a terminal, by application of or immersion in the composition described above, as indicated by arrows C.

Figure 3A:
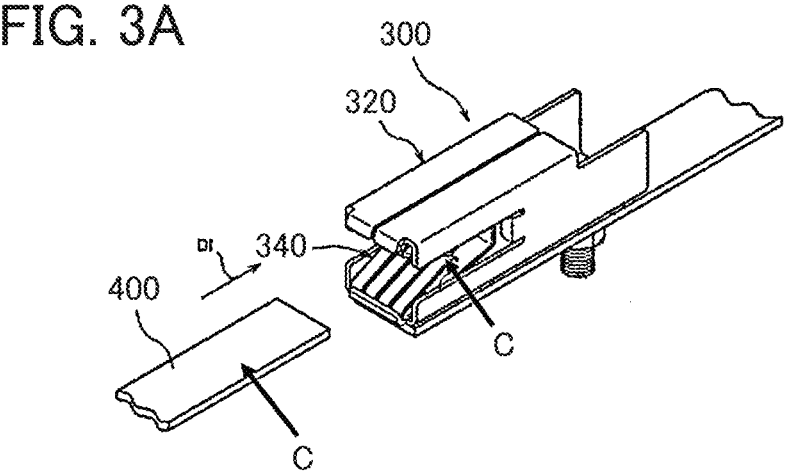
FIGS. 3A to 3C are perspective views of a high-current connector.
Figure 3B:
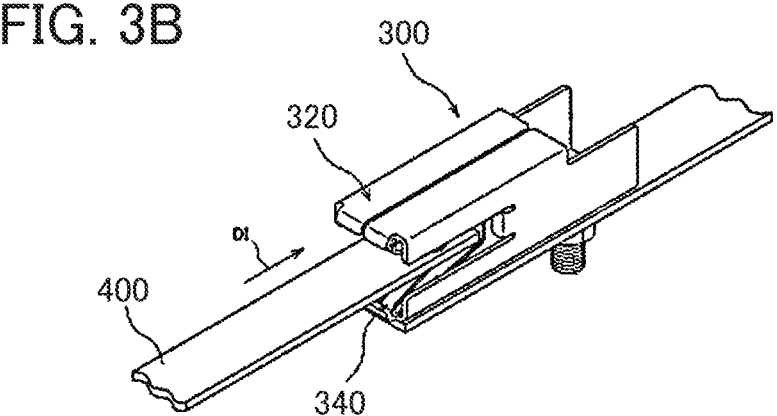
Figure 3C:
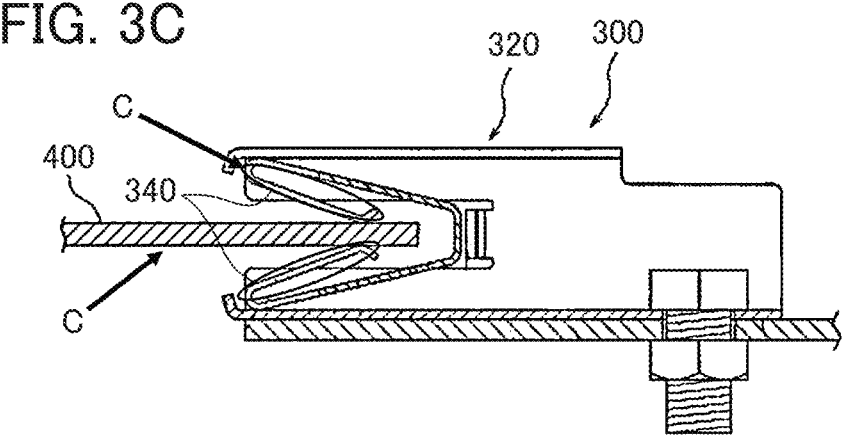

FIG. 3A and FIG. 3B are perspective views of another example of a high-current connector. The particulars of the high-current connector 300 of FIG. 3 are described in JP 2013-218837 A. FIG. 3A is a perspective view of the connector 300 before a connection target 400 is inserted into the connector 300, and FIG. 3B is a perspective view of the connector 300 with the connection target 400 inserted into the connector 300. FIG. 3C is a cross-sectional view of the connector 300 with the connection target 400 inserted into the connector 300. Arrow DI indicates the inserting direction of the connection target 400. The connector 300 includes a conductive holder 320 and a contact 340. When applying the contact member of the present invention to the high-current connector 300 of FIGS. 3A to 3C, the coating may be formed on a surface of the contact 340 and on an entire surface of the connection target 400 by application of or immersion in the composition described above, as indicated by arrows C.

Figure 4A:
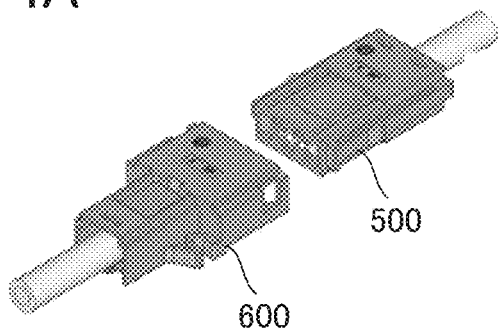
FIGS. 4A to 4C are perspective views of a high-current connector.
Figure 4B:
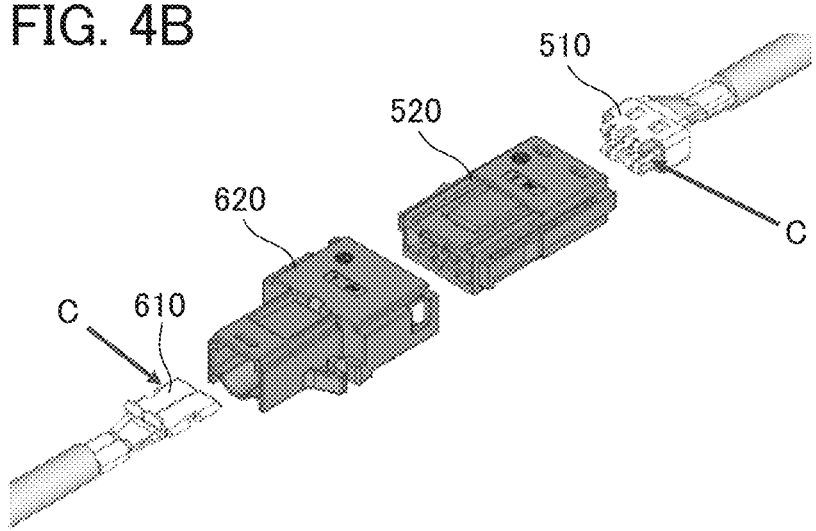
Figure 4C:
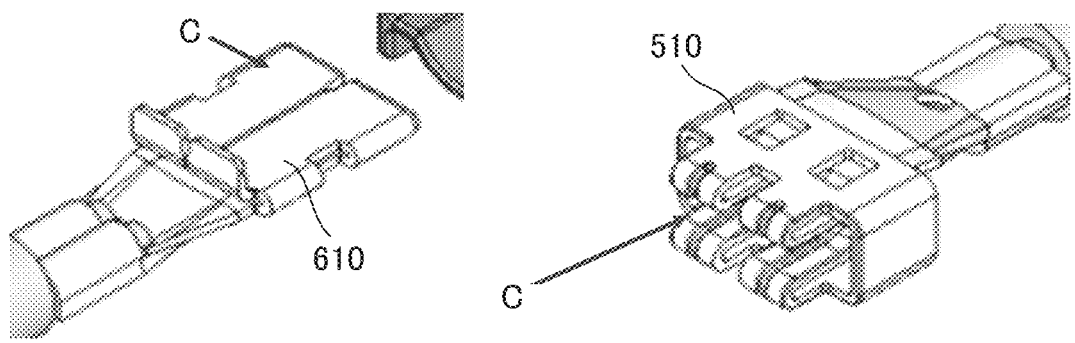

FIG. 4A to FIG. 4C are perspective views of other examples of high-current connectors. The high-current connectors 500 and 600 shown in FIG. 4A are respectively made up of a socket contact 510 and a socket housing 520, and a pin contact 610 and a pin housing 620 as shown in FIG. 4B. FIG. 4C is a perspective view of the socket contact 510 and the pin contact 610. When applying the contact member of the present invention to the high-current connectors 500 and 600 of FIGS. 4A to 4C, the coating may be formed on a surface of the socket contact 510 and on a surface of the pin contact 610 by application of or immersion in the composition described above, as indicated by arrows C.

EXAMPLES

The present invention is described in more specific terms below using Examples, without any intention of limiting the present invention to the examples.

In the description of Examples, metals may be indicated by element symbols instead of names, for example Ag for silver and Cu for copper.

<Preparation of Composition>

(Materials Used)

The compositions listed in the following tables contain the following components.

Fluorine-Based Solvent

Vertrel XF (product name, manufactured by Chemours-Mitsui Fluoroproducts Co., Ltd.) containing a compound of the following formula.

[Chemical 1]

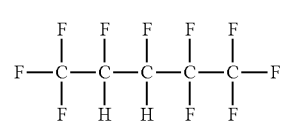

Fluorinated Oil Having a Polar Group (Specified Oil)

1H,1H-Perfluoro(2,5,8,11,14-pentamethyl-3,6,9,12,15-oxaoctadecan-1-ol) (Following Formula)

[Chemical 2]

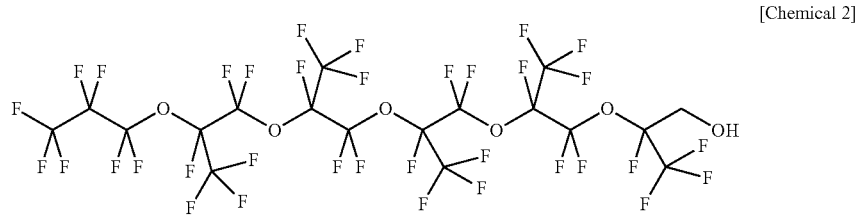 [SMILES: OCC(F)(OC(F)(F)C(F)(OC(F)(F)C(F)(OC(F)(F)C(F)(OC(F)(F)C(F)(OC(F)(F)C(F)(F)C(F)(F)F)C(F)(F)F)C(F)(F)F)C(F)(F)F)C(F)(F)F)C(F)(F)F]

1H,1H,2H,2H-Perfluorodecanethiol (Following Formula)

[Chemical 3]

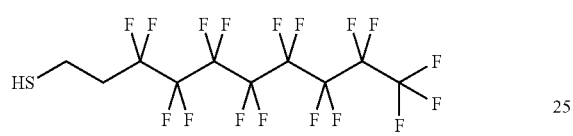

Metal Particles

Silver particles: Silbest reduction silver AGS-050 (product name), particle size 0.5 μm, (manufactured by Tokuriki Honten, Co., Ltd.)

(Types of Compositions)

Compositions were prepared by mixing the above components in proportions listed in Tables 1 and 2 shown below. Each composition contains a specified oil and metal particles that interact with each other and form the specified metal particles described above, while part of the specified oil remains as is in the composition. Namely, the obtained Compositions 1, 2, and 11 to 20 contained specified oil and specified metal particles.

TABLE 1

|  | Composition (Unit: mass %) | |
| --- | --- | --- |
| Component | 1 | 2 |
| 1H,1H-Perfluoro(2,5,8,11,14-pentamethyl-3,6,9,12,15-oxaoctadecan-1-ol) | 1.000 | 0.000 |
| 1H,1H,2H,2H-Perfluorodecanethiol | 0.000 | 1.000 |
| Silver particles | 1.000 | 1.000 |
| Vertrel XF | 98.000 | 98.000 |
| Total | 100.000 | 100.000 |

TABLE 2

|  | Composition (Unit: mass %) | | | | | | | | | | |
| --- | --- | --- | --- | --- | --- | --- | --- | --- | --- | --- | --- |
| Component | 10 | 11 | 12 | 13 | 14 | 15 | 16 | 17 | 18 | 19 | 20 |
| 1H,1H-Perfluoro(2,5,8,11,14-pentamethyl-3,6,9,12,15-oxaoctadecan-1-ol) | 1.000 | 1.000 | 1.000 | 1.000 | 1.000 | 1.000 | 1.000 | 1.500 | 2.000 | 2.500 | 3.000 |

TABLE 2-continued

| | Composition (Unit: mass %) | | | | | | | | | | |
|---|---|---|---|---|---|---|---|---|---|---|---|
| Component | 10 | 11 | 12 | 13 | 14 | 15 | 16 | 17 | 18 | 19 | 20 |
| Silver particles | 0.000 | 0.001 | 0.010 | 0.100 | 0.250 | 0.500 | 1.000 | 0.100 | 0.100 | 0.100 | 0.100 |
| Vertrel XF | 99.000 | 98.999 | 98.990 | 98.900 | 98.750 | 98.500 | 98.000 | 98.400 | 97.900 | 97.400 | 96.100 |
| Total | 100.000 | 100.000 | 100.000 | 100.000 | 100.000 | 100.000 | 100.000 | 100.000 | 100.000 | 100.000 | 100.000 |

<Production of Contact Member>

For production of samples to be used in an evaluation test (sliding test), the following probe and plate were prepared.

Probe: Pin Probe
  Contact shape: Spherical with 1 mm radius of curvature
  Base material: C1100 (tough pitch copper)
  Plating type: Soft Ag plating
  Plating thickness: 5 μm Plate: Test Piece
  Base material: C1100 (tough pitch copper)
  Plating type: Soft Ag plating
  Plating thickness: 5 μm Two types of samples, one with discoloration preventing treatment after Ag plating (alkanethiol film formation), and the other without the discoloration preventing treatment (non-treated Ag-plated surface) were prepared for both of the probe and the plate.

Next, using the compositions produced as described above, the probes and the plates were coated by dipping with each type of compositions. After the coating, the probes and the plates were let dry naturally at normal temperature for one hour, and thus probes having a predetermined coating and plates having a predetermined coating were prepared.

These probes and plates prepared as described above correspond to the contact member.

Evaluation (Evaluation Procedure)

The probe having the predetermined coating was rubbed on the plate having the predetermined coating prepared as described above, and the friction coefficient and the contact resistance were measured using a measurement device and in measurement conditions described below. The contact resistance was measured both at the start of sliding and during sliding. The friction coefficient is a friction coefficient measured during sliding.

A real-time observation was conducted simultaneously using a CCD camera, and the test was finished at a time point when exposure of a surface of Cu that is the base material was detected.

Measurement Device
  Friction and wear tester with simultaneous measurement of electrical contact resistance FPR-2300 (RHESCA Co., Ltd.) 0024

Measurement Conditions
  Sliding distance: 10 mm
  Sliding speed: 10 mm/s
  Contact load: 6 N
  Number of cycles: Test ended when exposure of Cu surface was detected (Evaluation Criteria)

The test conducted as above was followed by evaluation of the following four categories (1) to (4).

(1) Contact resistance (at the start of sliding)
(2) Contact resistance (during sliding)
(3) Friction coefficient (during sliding)
(4) Number of sliding cycles until a Cu surface becomes exposed For each of the above (1) to (4) categories, it is judged that a desired effect is achieved when reference values in Table 3 shown below are satisfied. For the contact resistance (at the start of sliding), for example, if it is less than 2.00 mΩ, it is judged that the desired effect is achieved.

TABLE 3

| Evaluation category | Reference value |
|---|---|
| (1) Contact resistance (at the start of sliding) (mΩ) | Less than 2.00 |
| (2) Contact resistance (during sliding) (mΩ) | Less than 2.00 |
| (3) Friction coefficient (during sliding) | Less than 1.00 |
| (4) Number of sliding cycles before exposure of Cu surface (cycles) | More than 10 |

In the rows "Effect" in Tables 4 to 9 shown below, "good" represents a case that satisfies the reference values in all of the above evaluation categories, and "excellent" represents a case with particularly good characteristics among these.

"Poor" represents a case that fails to satisfy a reference value even in one of the above evaluation categories.

Examples 1 and 2, and Comparative Example 1

Table 4 shown below shows the results of the test using Compositions 1 and 2. The contact resistance (at the start of sliding) in Table 4 shows a maximum value obtained before the number of sliding cycles exceeded two. The contact resistance (during sliding) and the friction coefficient (during sliding) show maximum values obtained after the number of sliding cycles exceeded two and until a Cu surface was exposed. These apply also to Tables 5 to 10 to be described later.

The probe and the plate in Comparative Example 1 are not treated with the composition. Namely, the probe and the plate in Comparative Example 1 do not have the predetermined coating.

Figure 5:
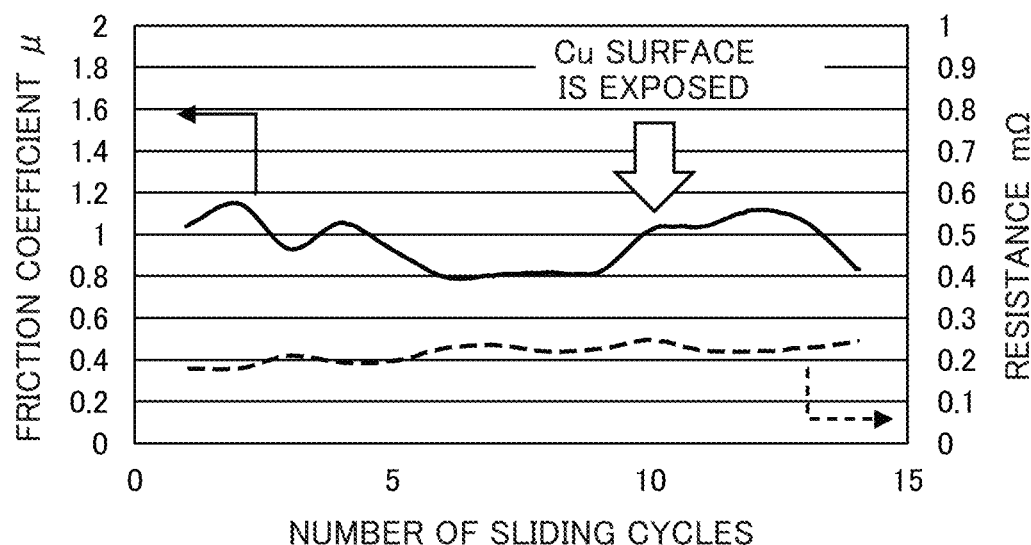
FIG. 5 is a chart showing the results of a sliding test of Comparative Example 1.
Figure 6:
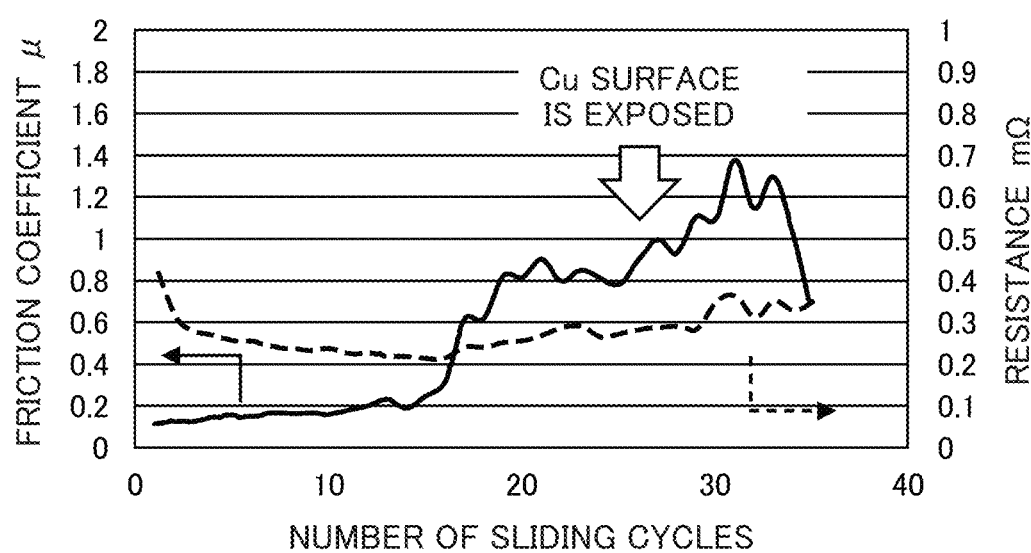
FIG. 6 is a chart showing the results of a sliding test of Example 1.
Figure 7:
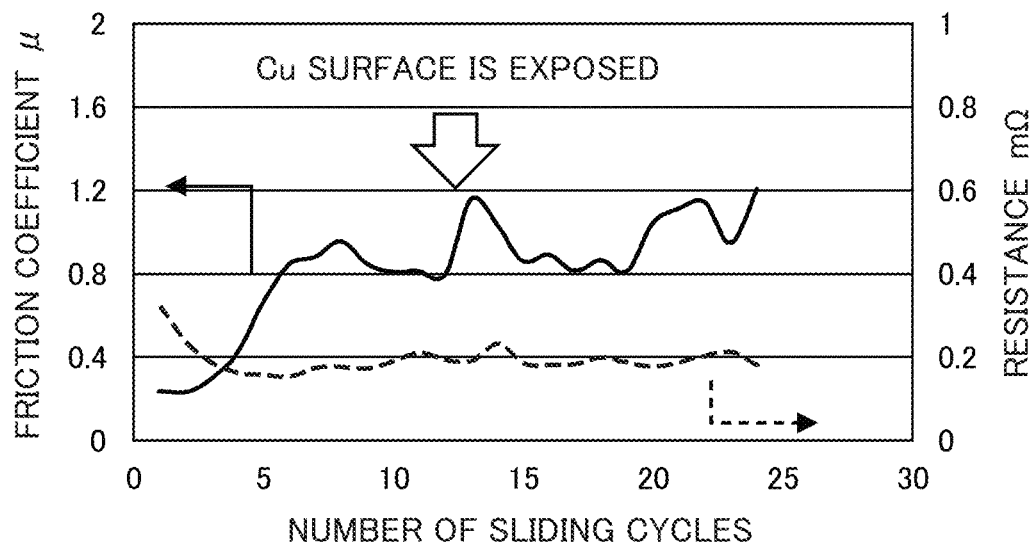
FIG. 7 is a chart showing the results of a sliding test of Example 2.
Figure 8:
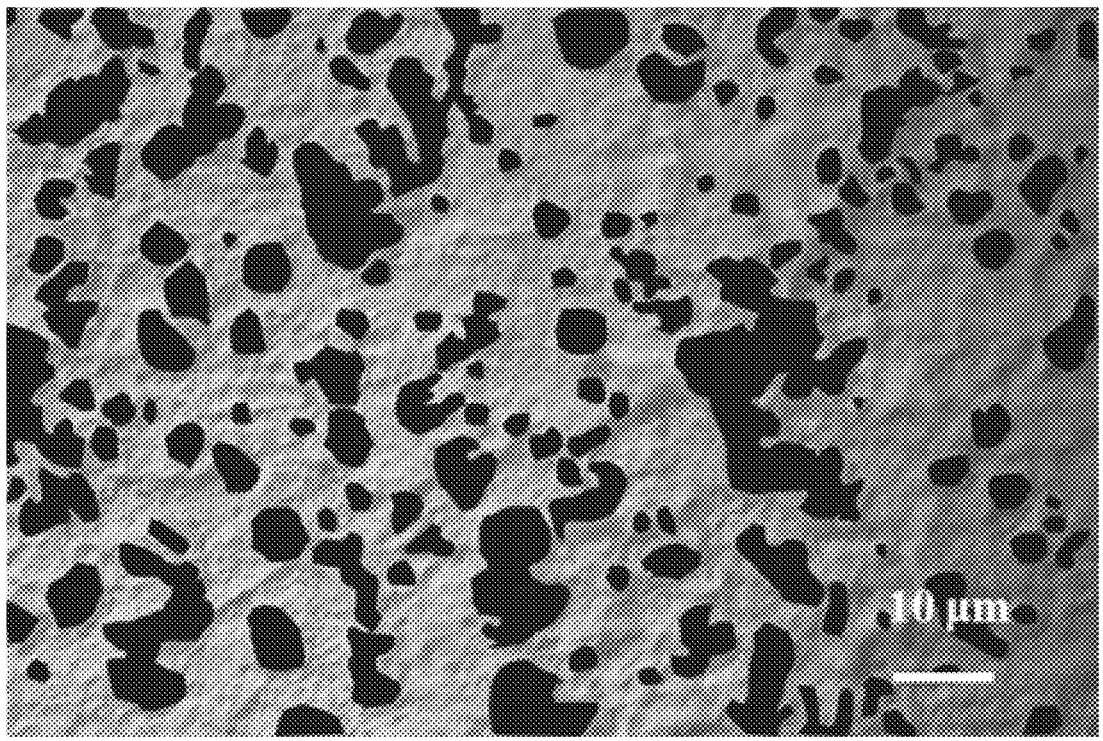
FIG. 8 is a polarizing microscope image of Example 10.
Figure 9:
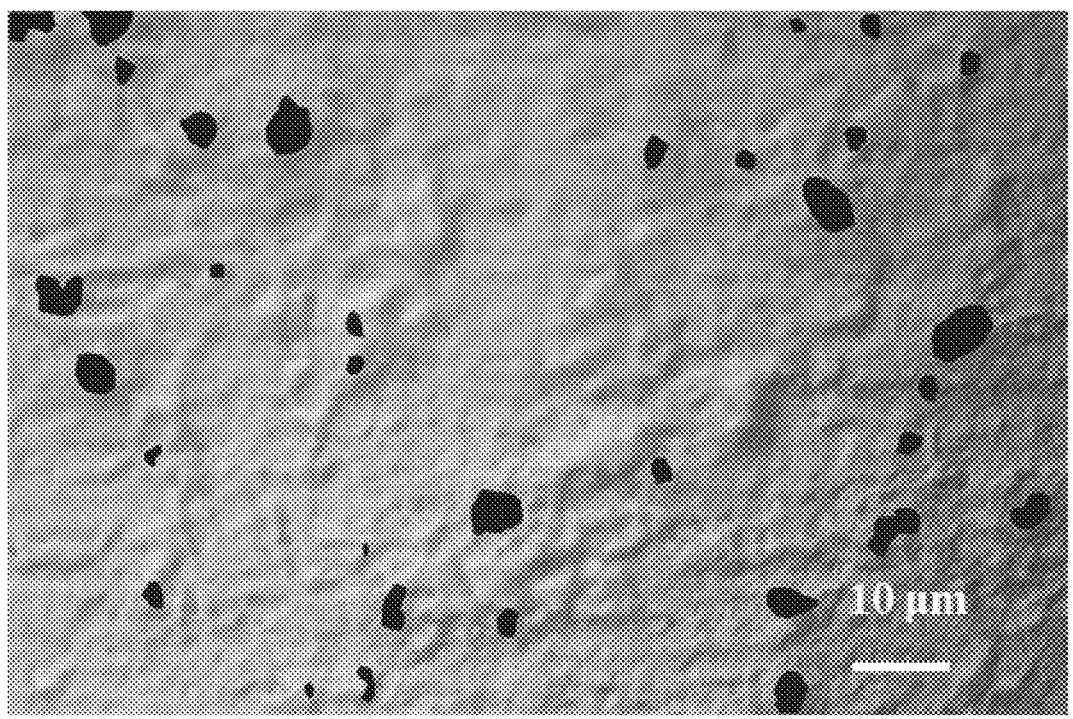
FIG. 9 is a polarizing microscope image of Example 7.
Figure 10:
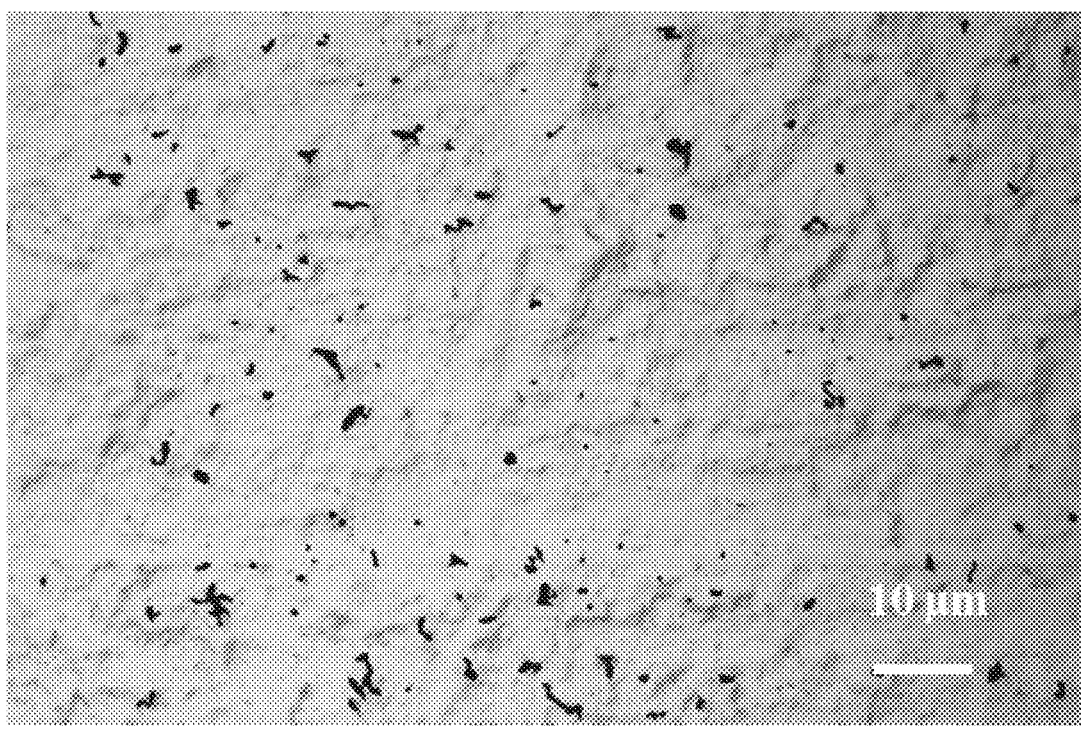
FIG. 10 is a polarizing microscope image of Example 6.
Figure 11:
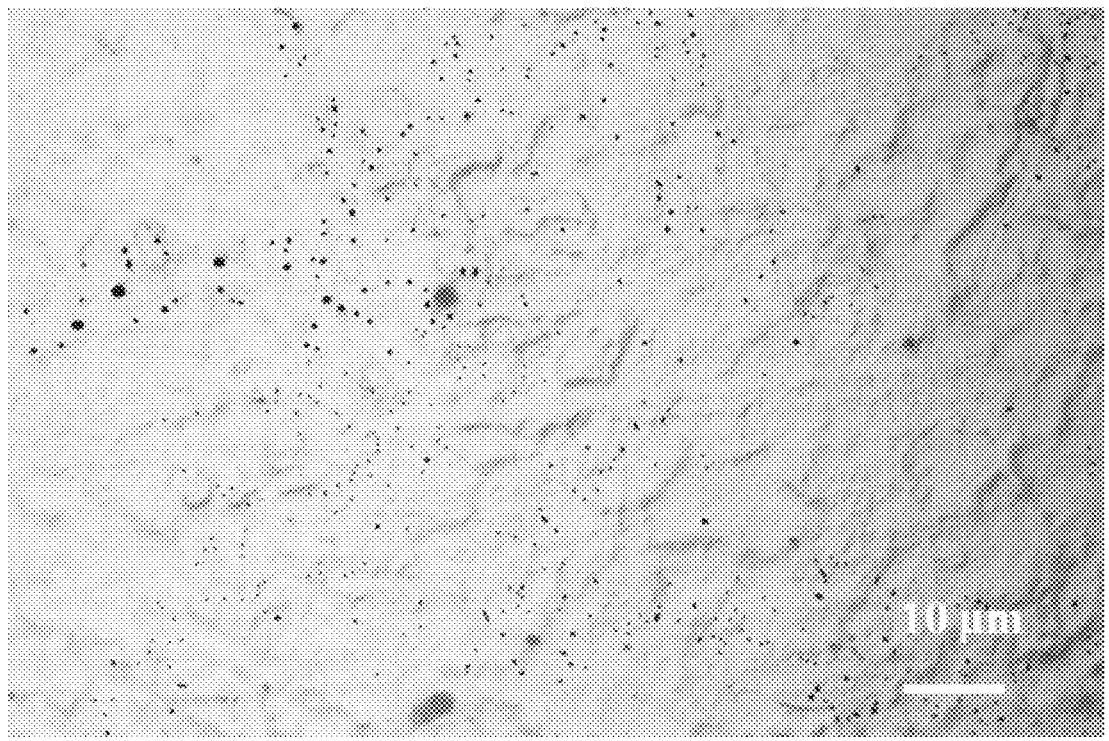
FIG. 11 is a polarizing microscope image of Example 5.

FIG. 5, FIG. 6, and FIG. 7 respectively show concrete test results of Comparative Example 1, Example 1, and Example 2.

TABLE 4

|  |  | Comparative Example | Example | |
|---|---|---|---|---|
|  |  | 1 | 1 | 2 |
| Type of composition | | — | 1 | 2 |
| Probe-and-plate discoloration preventing treatment | | None | None | None |
| Evaluation category | Contact resistance (at the start of sliding) (mΩ) | 0.18 | 0.44 | 0.32 |
| | Contact resistance (during sliding) (mΩ) | 0.25 | 0.29 | 0.21 |
| | Friction coefficient (during sliding) | 1.05 | 0.80 | 0.94 |
| | Number of sliding cycles before exposure of Cu surface (cycles) | 10 | 25 | 13 |
| Effect | | Poor | Excellent | Good |

The number of sliding cycles until a Cu surface was exposed increased in Examples 1 and 2 as compared to Comparative Example 1, which means the sliding durability improved. Example 1 was more preferable, which revealed that 1H,1H-perfluoro(2,5,8,11,14-pentamethyl-3,6,9,12,15-oxaoctadecan-1-ol), which has a hydroxyl group as the polar group, was more preferable than the other, even though the main chain has a similar structure.

Examples 3 and 4, and Comparative Example 2

Table 5 to be described later shows the results of the test using Composition 16. The probe and the plate in Comparative Example 2 are not treated with the composition. Namely, the probe and the plate in Comparative Example 2 do not have the predetermined coating.

TABLE 5

|  |  | Comparative Example | Example | |
|---|---|---|---|---|
|  |  | 2 | 3 | 4 |
| Type of composition | | — | 16 | 16 |
| Probe-and-plate discoloration preventing treatment | | Done | Done | None |
| Evaluation category | Contact resistance (at the start of sliding) (mΩ) | 2.08 | 0.34 | 0.42 |
| | Contact resistance (during sliding) (mΩ) | 0.54 | 0.30 | 0.23 |
| | Friction coefficient (during sliding) | 0.12 | 0.21 | 0.21 |
| | Number of sliding cycles before exposure of Cu surface (cycles) | 100 | 15 | 25 |
| Effect | | Poor | Good | Excellent |

Comparative Example 2 corresponds to an embodiment in which a coating of alkanethiol is formed on an Ag-plated surface as a treatment to prevent sulfidation. While Comparative Example 2 withstood 100 sliding cycles until a Cu surface was exposed, the contact resistance at the start of sliding was as high as 2.08 mΩ, as compared to Comparative Example 1.

In comparison to this, Examples 3 and 4 indicated a good balance between low electrical resistance and sliding durability. When Example 3 in which alkanethiol coating was formed and Example 4 in which no alkanethiol coating was formed were compared, Example 4 in which no alkanethiol coating was formed was found more preferable.

Examples 5 to 10, and Comparative Example 3

Table 6 below shows the results of the test using Compositions 10 to 16. FIG. 8, FIG. 9, FIG. 10, and FIG. 11 respectively show polarizing microscope images of the observed appearances of specified metal particles of Examples 10, 7, 6, and 5. The specified metal particles in the images are painted black by image recognition software for better visibility.

The values in the row "Area percentage of specified metal particles (%)" in Table 6 correspond to the ratio (%) of an area of specified metal particles to an area of coating when the coating is observed from a normal direction of the coating as described above, which is measured as described in the foregoing.

TABLE 6

|  | Comparative Example | Example | | | | | |
|---|---|---|---|---|---|---|---|
|  | 3 | 5 | 6 | 7 | 8 | 9 | 10 |
| Type of composition | 10 | 11 | 12 | 13 | 14 | 15 | 16 |
| Probe-and-plate discoloration preventing treatment | Done | Done | Done | Done | Done | Done | Done |
| Area percentage of specified metal particles (%) | 0.0 | 0.6 | 1.5 | 3.6 | 7.5 | 15.0 | 30.2 |
| Average secondary particle size of specified metal particles (μm) | 0.0 | 0.2 | 0.6 | 1.7 | 1.9 | 2.1 | 2.3 |
| Evaluation category Contact resistance (at the start of sliding) (mΩ) | 2.30 | 1.24 | 1.51 | 0.90 | 0.71 | 0.50 | 0.34 |
| Contact resistance (during sliding) (mΩ) | More than 5 mΩ | 0.52 | 0.51 | 0.82 | 0.62 | 0.34 | 0.30 |
| Friction coefficient (during sliding) | 0.12 | 0.13 | 0.13 | 0.24 | 0.24 | 0.22 | 0.21 |
| Number of sliding cycles before exposure of Cu surface (cycles) | More than 600 cycles | 45 | 48 | 206 | 104 | 44 | 15 |
| Effect | Poor | Good | Good | Excellent | Excellent | Excellent | Good |

While Comparative Example 3 with a composition not containing silver particles withstood more than 600 sliding cycles until a Cu surface was exposed, the contact resistance at the start of sliding was high. While the friction coefficient was consistent, the contact resistance soared suddenly to more than 5 mΩ, hence the result is "poor."

Examples 5 to 10 indicated a good balance between low electrical resistance and sliding durability.

A comparison of Examples 5 to 10 revealed that better results were achieved when the specified metal particles had an average secondary particle size of 1.7 μm to 2.1 μm. Also, the results were better when the area percentage (%) of specified metal particles was 3.6% to 15.0%.

Examples 11 to 15, and Comparative Example 1

Table 7 below shows the results of the test using Compositions 13 and 17 to 20.

TABLE 7

|  | Comparative Example | Example | | | | |
|---|---|---|---|---|---|---|
|  | 1 | 11 | 12 | 13 | 14 | 15 |
| Type of composition | — | 13 | 17 | 18 | 19 | 20 |
| Probe-and-plate discoloration preventing treatment | None | None | None | None | None | None |
| Evaluation category Contact resistance (at the start of sliding) (mΩ) | 0.18 | 0.32 | 0.30 | 0.31 | 0.45 | 0.52 |
| Contact resistance (during sliding) (mΩ) | 0.25 | 0.33 | 0.24 | 0.15 | 0.31 | 0.42 |
| Friction coefficient (during sliding) | 1.05 | 0.31 | 0.33 | 0.34 | 0.28 | 0.25 |
| Number of sliding cycles before exposure of Cu surface (cycles) | 10 | 45 | 300 | More than 600 cycles | 410 | 200 |
| Effect | Poor | Good | Excellent | Excellent | Excellent | Good |

Examples 11 to 15 indicated a good balance between low electrical resistance and sliding durability.

Examples 12 to 14, in particular, with compositions having a concentration of 1H,1H-perfluoro(2,5,8,11,14-pentamethyl-3,6,9,12,15-oxaoctadecan-1-ol) of 1.500 mass % to 2.500 mass %, showed outstanding sliding durability. In other words, superior effects were achieved when the ratio of the specified oil content (mass %) to the specified metal particle content (mass %) (specified oil content (mass %)/specified metal particle content (mass %)) was 15 to 25.

Examples 16 to 20

Table 8 below shows the results of the test using Composition 13. With Examples 16 to 20, a comparison was made on cases with different maximum heights Ry of plate surface roughness.

TABLE 8

|  |  | Example | | | | |
|---|---|---|---|---|---|---|
|  |  | 16 | 17 | 18 | 19 | 20 |
| Type of composition | | 13 | 13 | 13 | 13 | 13 |
| Maximum height Ry of plate surface roughness (pm) | | 0.3 | 0.5 | 0.9 | 1.7 | 3.9 |
| Evaluation category | Contact resistance (at the start of sliding) (mΩ) | 1.22 | 1.10 | 1.32 | 0.90 | 0.33 |
| | Contact resistance (during sliding) (mΩ) | 0.53 | 0.53 | 0.51 | 0.82 | 0.32 |
| | Friction coefficient (during sliding) | 0.14 | 0.21 | 0.12 | 0.24 | 0.26 |
| | Number of sliding cycles before exposure of Cu surface (cycles) | 15 | 45 | 48 | 206 | 14 |
| Effect | | Good | Excellent | Excellent | Excellent | Good |

Examples 16 to 20 with the maximum height Ry of plate surface roughness being 0.3 μm to 3.9 μm withstood large numbers of sliding cycles until a Cu surface was exposed. Examples 17 to 19, in particular, having a maximum height Ry of plate surface roughness of 0.5 μm to 1.7 μm, proved preferable.

Examples 21 to 26, and Comparative Example 4

Table 9 below shows the results of the test using Compositions 10 to 16. With Examples 21 to 26, a comparison was made on cases with different ratios of the average secondary particle size of specified metal particles to the maximum height Ry of plate surface roughness.

TABLE 9

| | | Comparative Example | Example | | | | | |
|---|---|---|---|---|---|---|---|---|
| | | 4 | 21 | 22 | 23 | 24 | 25 | 26 |
| | Type of composition | 10 | 11 | 12 | 13 | 14 | 15 | 16 |
| | Probe-and-plate discoloration preventing treatment | Done | Done | Done | Done | Done | Done | Done |
| | Average secondary particle size of specified metal particles (μm) | 0.0 | 0.2 | 0.6 | 1.7 | 1.9 | 2.1 | 2.3 |
| | Maximum height Ry of plate surface roughness (μm) | 1.7 | 1.7 | 1.7 | 1.7 | 1.7 | 1.7 | 1.7 |
| | Secondary particle size (μm)/ Surface roughness Ry (μm) | 0.0 | 0.1 | 0.3 | 1.0 | 1.1 | 1.2 | 1.3 |
| Evaluation category | Contact resistance (at the start of sliding) (mΩ) | 2.30 | 1.24 | 1.51 | 0.90 | 0.71 | 0.50 | 0.34 |
| | Contact resistance (during sliding) (mΩ) | More than 5 mΩ | 0.52 | 0.55 | 0.82 | 0.62 | 0.34 | 0.30 |
| | Friction coefficient (during sliding) | 0.12 | 0.13 | 0.13 | 0.24 | 0.24 | 0.22 | 0.21 |
| | Number of sliding cycles before exposure of Cu surface (cycles) | More than 600 cycles | 45 | 48 | 206 | 104 | 44 | 15 |
| | Effect | Poor | Good | Good | Excellent | Excellent | Excellent | Good |

While Comparative Example 4 with a composition not containing silver particles withstood 600 or more sliding cycles until a Cu surface was exposed, the contact resistance at the start of sliding was high. While the friction coefficient was consistent, the contact resistance soared suddenly to more than 5 mΩ, hence the result is "poor."

Examples 21 to 26 indicated a good balance between low electrical resistance and sliding durability.

Examples 23 to 25, in particular, with the ratio of the average secondary particle size of specified metal particles to the maximum height Ry of plate surface roughness (secondary particle size/maximum height Ry) being 1.0 to 1.2, proved preferable.

Examples 27 to 31

Five types of Ag-plated probes and plates were prepared with differing Vickers hardnesses Hv (180, 150, 120, 90, and 60) as samples to be used in the evaluation test (sliding test). Each combination of probe and plate had the same Vickers hardness. The probes and the plates were treated with Composition 18. Table 10 below shows the results.

Figure 12:
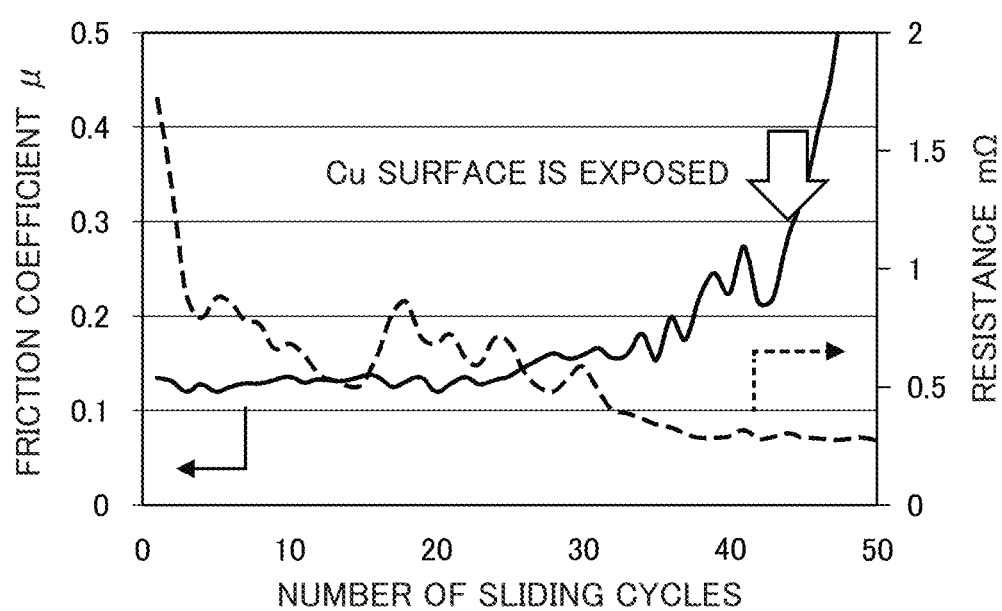
FIG. 12 is a chart showing the results of a sliding test of Example 27.
Figure 13:
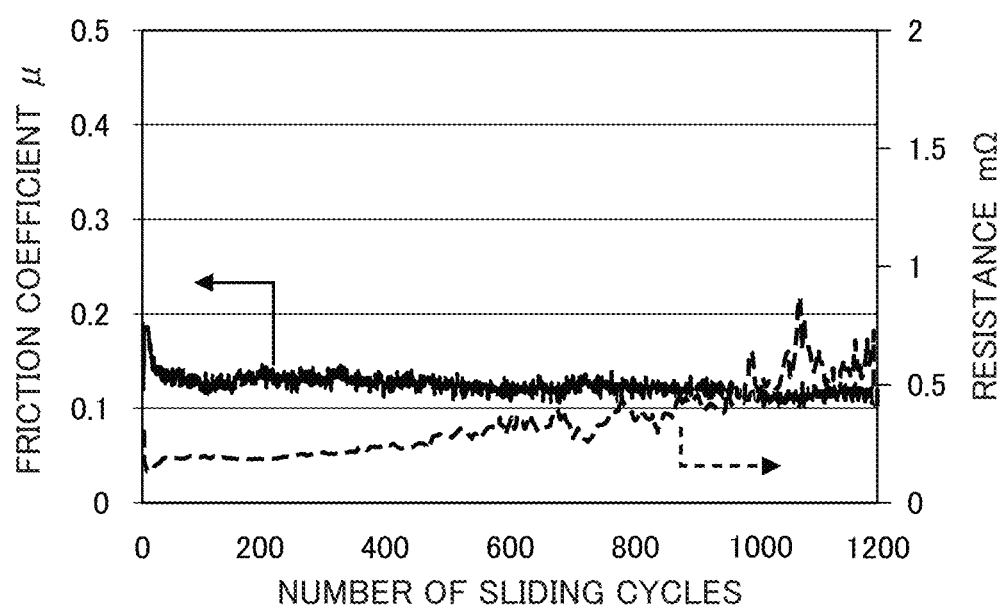
FIG. 13 is a chart showing the results of a sliding test of Example 31.

FIG. 12 and FIG. 13 respectively show concrete test results of Example 27 and Example 31.

TABLE 10

|  |  | Example | | | | |
|---|---|---|---|---|---|---|
|  |  | 27 | 28 | 29 | 30 | 31 |
| Type of composition | | 18 | 18 | 18 | 18 | 18 |
| Vickers hardness of probe and plate (Hv) | | 180 | 150 | 120 | 90 | 60 |
| Evaluation category | Contact resistance (at the start of sliding) (mΩ) | 1.74 | 1.70 | 1.69 | 0.32 | 0.31 |
|  | Contact resistance (during sliding) (mΩ) | 0.84 | 0.80 | 0.85 | 0.73 | 0.83 |
|  | Friction coefficient (during sliding) | 0.27 | 0.23 | 0.17 | 0.18 | 0.18 |
|  | Number of sliding cycles before exposure of Cu surface (cycles) | 43 | 620 | More than 1200 cycles | More than 1200 cycles | More than 1200 cycles |
| Effect | | Good | Good | Excellent | Excellent | Excellent |

Examples 27 to 31 in which the plate and the probe had a Vickers hardness of not greater than 180 Hv indicated a good balance between low electrical resistance and sliding durability.

It was revealed that Examples 29 to 31, in particular, in which the plate and the probe had a Vickers hardness of not greater than 120 Hv, were preferable.

What is claimed is:

1. A contact member comprising:
   a metal base; and
   a coating disposed on at least part of the metal base, the coating containing fluorinated oil having a polar group, and metal particles surface-treated with a fluorine-based compound having a polar group,
   wherein the metal particles have an average primary particle size of 0.2 μm to 10.0 μm, and wherein a metal of the metal base is identical to that of the metal particles.

2. The contact member according to claim 1, wherein the polar group is a hydroxyl group.

3. The contact member according to claim 1, wherein a ratio of a content (mass %) of the fluorinated oil to a content (mass %) of the metal particles (fluorinated oil content (mass %)/metal particle content (mass %)) is 15 to 25.

4. The contact member according to claim 1, wherein a ratio of an area of the metal particles to an area of the coating, when the coating is observed from a normal direction of the coating, is 3.6% to 15.0%.

5. The contact member according to claim 1, wherein the metal base has a Vickers Hardness of 180 Hv or less.

6. The contact member according to claim 5, wherein a ratio of an average secondary particle size (μm) of the metal particles to a maximum height Ry (μm) of surface roughness of the metal base (average secondary particle size (μm) of the metal particles/maximum height Ry (μm) of surface roughness of the metal base) is 1.0 to 1.2.

7. The contact member according to claim 1, wherein the metal base has surface roughness with a maximum height Ry of 0.5 μm to 1.7 μm.

8. A connector comprising the contact member according to claim 1.

9. A method for producing the contact member according to claim 1, comprising forming the coating by supplying a composition comprising the fluorinated oil having the polar group; and the metal particles surface-treated with the fluorine-based compound having the polar group on the metal base.

10. The contact member according to claim 1, wherein the metal particles have an average secondary particle size of 1.7 μm to 2.1 μm.

\* \* \* \* \*